US012689874B2

(12) United States Patent
Rustagi et al.

(10) Patent No.: US 12,689,874 B2
(45) Date of Patent: Jul. 21, 2026

(54) METHOD AND SYSTEM FOR SMS COMMUNICATION IN 3GPP NETWORKS

(71) Applicant: Telefonaktiebolaget LM Ericsson (publ), Stockholm (SE)

(72) Inventors: Saket Rustagi, Delhi (IN); Tushar Sabharwal, New Delhi (IN); Nipun Sharma, New Delhi (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 322 days.

(21) Appl. No.: 18/038,840

(22) PCT Filed: Jan. 21, 2021

(86) PCT No.: PCT/IN2021/050059
§ 371 (c)(1),
(2) Date: May 25, 2023

(87) PCT Pub. No.: WO2022/157794
PCT Pub. Date: Jul. 28, 2022

(65) Prior Publication Data
US 2024/0089710 A1 Mar. 14, 2024

(51) Int. Cl.
*H04L 5/00* (2006.01)
*H04M 3/42* (2006.01)
*H04W 4/14* (2009.01)

(52) U.S. Cl.
CPC ............. *H04W 4/14* (2013.01); *H04L 5/0044* (2013.01); *H04M 3/42382* (2013.01)

(58) Field of Classification Search
CPC .... H04W 4/14; H04L 5/0044; H04M 3/42382
See application file for complete search history.

(56) References Cited

U.S. PATENT DOCUMENTS

2007/0142052 A1 6/2007 Kalavade
2020/0204962 A1* 6/2020 Hua ...................... H04W 48/18
(Continued)

OTHER PUBLICATIONS

3rd Generation Partnership Project, "3rd Generation Partnership Project; Technical Specification Group Core Network and Terminals; 5G System—Phase 1; CT WG4 Aspects (Release 16)", Technical Report, TR 29.891 V16.0.0, Jul. 2020, pp. 1-146, 3GPP.
(Continued)

*Primary Examiner* — Joseph E Dean, Jr.

(74) *Attorney, Agent, or Firm* — COATS & BENNETT, PLLC

(57) ABSTRACT

A User configures the option in his/her UE to deliver the SMS via Operator's application client installed on UE. This configuration will be saved in the UDM as an option opted by UE. SMS-GMSC receives the "SMS delivery flag (indicating alternate delivery mechanism is enabled)" from UDM in response to the "Send Routing Infor for SM" message. If the traditional SMS delivery over mobile operator network fails (e.g. no connectivity), then SMS-GMSC will trigger NEF to re-attempt the SMS delivery to UE. (NEF can be an optional network function as Application function is trusted one and hosted in Operator's network). NEF sends the SMS to Application Function (Mobile Network Operator's Serer) which encrypts the SMS payload and delivers the SMS to operator's application client e.g. Mobile Network Operator App installed on UE over the alternative data connectivity (Ex. Wi-Fi Broadband). Therefore, if the User has data connectivity by alternative means (via different channels
(Continued)

like Wi-Fi hotspot, Home Wi-Fi broadband, another Operator SIM etc.), it should be possible to deliver an SMS update on Operator's application client installed on UE.

8 Claims, 6 Drawing Sheets

(56) References Cited

U.S. PATENT DOCUMENTS

| | | | |
|---|---|---|---|
| 2020/0396571 A1 | 12/2020 | Kim | |
| 2022/0116770 A1* | 4/2022 | Li | H04L 63/0861 |
| 2022/0360954 A1* | 11/2022 | Castellanos Zamora | H04W 60/00 |

OTHER PUBLICATIONS

3rd Generation Partnership Project, "3rd Generation Partnership Project; Technical Specification Group Services and System Aspects; System architecture for the 5G System (5GS); Stage 2 (Release 16)", Technical Specification, TS 23.501 V16.7.0, Dec. 2020, pp. 1-450, 3GPP.

Katinakis, N. "Switching on SMS over Wi-Fi on our mobile networks", May 6, 2020, pp. 1-4, retrieved from: https://www.telstra.com.au/exchange/switching-on-sms-over-wi-fi-on-our-mobile-network, retrieved on Jan. 14, 2022, Telstra.com.

3rd Generation Partnership Project, "3rd Generation Partnership Project; Technical Specification Group Core Network and Terminals; Technical realization of the Short Message Service (SMS) (Release 16)", Technical Specification, 3GPP TS 23.040 V16.0.0 , Jul. 2020, pp. 1-216, 3GPP, France.

3rd Generation Partnership Project, "3rd Generation Partnership Project; Technical Specification Group Core Network and Terminals; Non-Access-Stratum (NAS) protocol for 5G System (5GS); Stage 3; (Release 17)", Technical Specification, Technical Specification, Dec. 2020, pp. 1-745, 3GPP, France.

3rd Generation Partnership Project, "3rd Generation Partnership Project; Technical Specification Group Core Network and Terminals; Non-Access-Stratum (NAS) protocol for 5G System (5GS); Stage 3; (Release 17)", Technical Specification, Technical Specification, 3GPP TS 24.501 V17.1.0, Dec. 2020, pp. 1-745, 3GPP, France.

* cited by examiner

300

METHOD AND SYSTEM FOR SMS COMMUNICATION IN 3GPP NETWORKS

TECHNICAL FIELD

The present disclosure relates to communication in 3GPP networks and in particular, relates to short message service (SMS) communication.

BACKGROUND

With the improvements in wireless technology over the last decade, mobile devices are finding a place in our day-to-day lives beyond imagination. Initially designed to support voice and data, with the advent of social, economic and immersive use cases, the expectation of coverage and capacity has increased many folds.

As a part of mobile telephony, SMS (short message service) is a text messaging service component of most telephone, Internet, and mobile device systems. It uses standardized communication protocols to enable mobile devices to exchange short text messages. The Short Message Service (SMS) provides a means of sending messages of limited size to and from GSM/UMTS/EPS mobiles. The provision of SMS requires a Service Centre, which acts as a store and forward center for short messages. Thus, a GSM/UMTS/EPS PLMN needs to support the transfer of short messages between service centers and mobiles.

SMS does an important role in authentication and logging to applications. There are multiple applications which would require OTP/PIN update (almost immediately), for example:

a) Mobile app based cab booking provides the SMS based OTP upon having received booking the taxi/cab for ride. OTP pin is needed for the ride to be initiated by the driver.

b) Even retrieving the old password or change the old password for mail account, the SMS/OTP is one of the options enabled.

c) Financial transactions might require OTP/SMS pin (2-factor authentication) to continue/authenticate the user's identity.

Mobile originated messages shall be transported from UE to a Service Centre. These may be destined for other mobile users, or for subscribers on a fixed network. Mobile terminated messages shall be transported from a Service Centre to UE. These may be inputted to the Service Centre by other mobile users (via a mobile originated short message), by ESME (External Short Message Entity) or by a variety of other sources, e.g. speech, telex, or facsimile.

There may be multiple example ways to deliver/receive the SMS for UE in 3GPP networks such as 4G/5G and. Example mechanisms are:

a) SMS over NAS: The purpose of the transport of NAS messages procedure is to carry SMS messages in an encapsulated form between the MME and the UE. This information element is used to encapsulate the SMS messages transferred between the UE and the network. Such communication is based on control plane communication primarily known as NAS signaling between AMF/MME to UE b) SMS over IP/IMS: SMS over IMS is a part of VoLTE. VoLTE is Voice over LTE. VoLTE enables HD calling as calls are placed over the 4G network instead of 3G or 2G. Along with calls, SMS is also sent over LTE.

The above-highlighted procedures are based on network connectivity provided by the operator towards UE. However, there exists quite high possibility that the network connectivity may not be available anytime anywhere. The connectivity issues (i.e. patchy coverages) is a universal problem (example indoor coverage) and especially in the developing countries with dark spots, patchy coverage by respective operators due to different reasons. Network coverage problem is more prominently seen in rural areas which might have business challenges to provide the best coverages based on respective revenue generation. Additionally, these issues can be further experienced in roaming scenarios (both national and international roaming) where visitor network or VPLMN could have inter-connectivity issues.

There are multiple reasons why a user/UE might not be connected to mobile operator network at a given time and hence the SMS delivery is not possible or delayed, which might not be acceptable. Some of the example scenarios are as follows:

a) For Multi SIM devices, connectivity might be provided by alternative operator like Operator B, but Operator A (default operator) does not have connectivity due to patchy network. In an example, Multi SIM UE is very popular in Asia including India and China (⅓rd world population) and 3GPP has acknowledged the same and got it prioritized in 3GPP Release 17 standardization. There are more than 200+ models available in India with Multi SIM Device support (including ESIM). Patchy networks and Other factors e.g. separation of Official and personal mobile number in same UE via Multi SIM etc. has led to deep interest and high purchases of Multi SIM mobile devices from the end customers.

b) UE has data connectivity via Wi-Fi hotspot, fixed broadband, etc. but does not have connectivity/compatibility with operator "A" for a feature like Wi-Fi calling, SMS over Wi-Fi, etc. There can be multiple reasons why UE has no connectivity with an operator. For example, UE is not compatible to provide Wi-Fi calling/SMS over Wi-Fi feature, Operator has not implemented ePDG/N3IWF, IMS network etc. Example: In India, many of the operators do not provide facility of Wi-Fi calling yet.

c) Roaming scenarios: There exists a possibility that user might not have subscribed for International Roaming services (which are expensive), however, then the user will not receive the incoming SMS which are needed for critical transactions like banking transactions.

d) SMS is based on store and forward concept and therefore there can be delay in SMS delivery, which might be obsolete for the time sensitive transactions.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

SMS plays an important role including scenarios like authentication enabled via unique MSISDN number registered by the user with various service providers like app-based cab booking, filing tax returns, and transactions with banks etc. For example, the user initiates an activity where he or she is expecting the OTP for authentication like cab booking. Many times due to either congestion on SMSC (or any other network node) or non-connectivity to the mobile phone (e.g. patchy network), the SMS is not delivered or delivered quite late post expiry time (as SMS is delivered with Store and forward technology).

Therefore, if the User has data connectivity by alternative means (via different channels like Wi-Fi hotspot, Home Wi-Fi broadband, another Operator SIM etc.), it should be possible to deliver an SMS update on Operator's application client installed on UE. In an example, Mobile Network Operator's App these days is very common and installed by the majority of subscribers.

On high level, User will be able to configure the option in his/her UE to deliver the SMS via Operator's application client installed on UE. This configuration will be saved in the UDM as an option opted by UE.

a) SMS-GMSC will receive the "SMS delivery flag (indicating alternate delivery mechanism is enabled)" from UDM in response to the "Send Routing Info for SM" message.

b) If the traditional SMS delivery over mobile operator network fails (e.g. no connectivity), then SMS-GMSC will trigger NEF to re-attempt the SMS delivery to UE. (NEF can be an optional network function as Application function is trusted one and hosted in Operator's network).

c) NEF sends the SMS to Application Function (Mobile Network Operator's Server) which encrypts the SMS payload and delivers the SMS to operator's application client e.g. Mobile Network Operator App installed on UE over the alternative data connectivity (Ex. Wi-Fi Broadband).

Overall, the present subject matter appropriates an IP connectivity (between UE and Application Function), such IP connectivity having been rendered by either by a trusted or non-trusted non-3gpp access network or a 3gpp network in case of Multi-SIM device.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

4

Figure 1A:
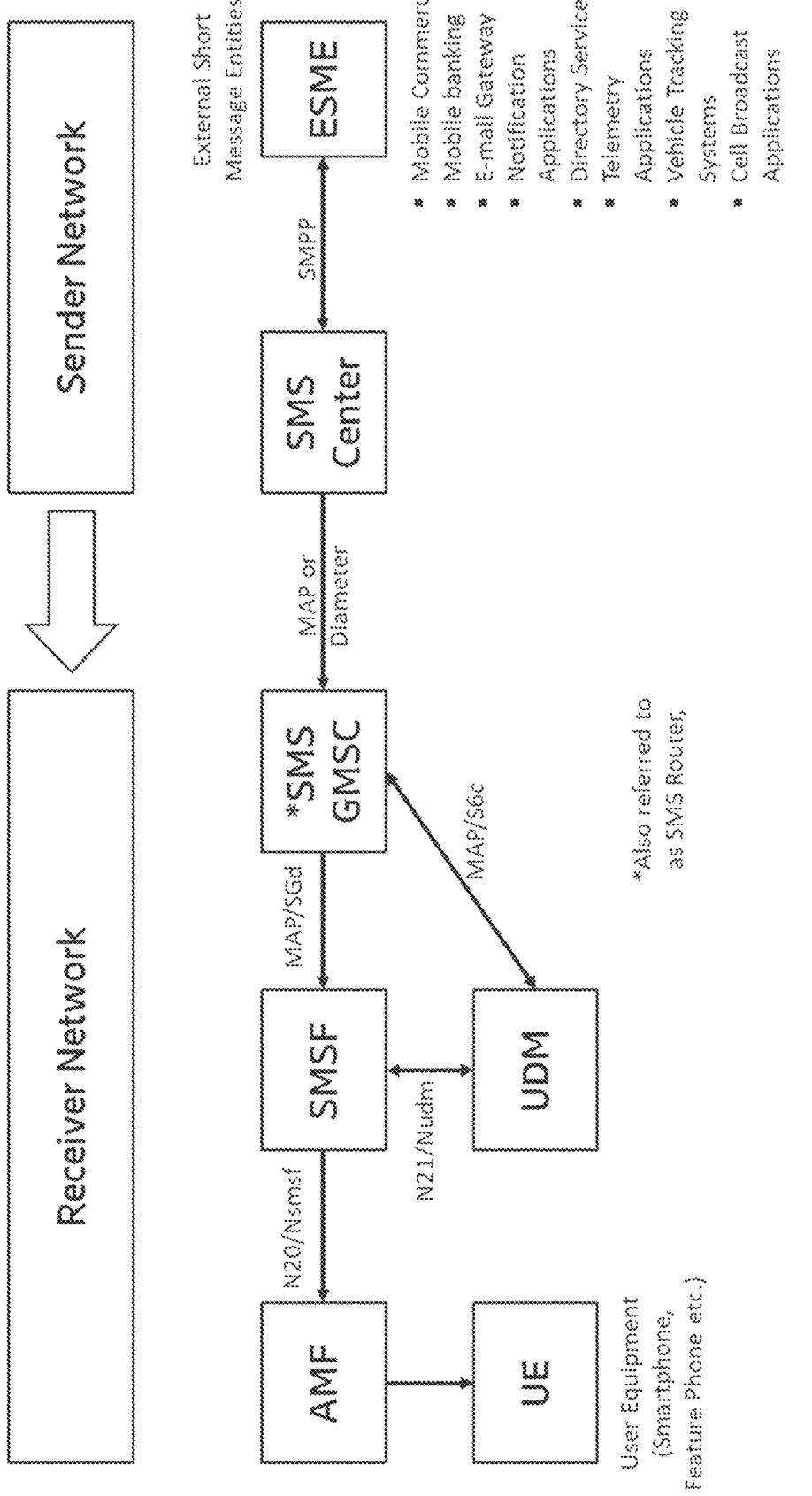
FIG. 1 illustrates state of the art artifacts and known call flows from an SMSC perspective in 3GPP networks.

Phase to operator's application client installed at UE, in accordance with an embodiment of the present subject matter.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

At least an objective of the present subject matter is to provide enhanced user experience/better connectivity for MT SMS when connectivity by mobile network operator is not available (indoor location, patchy coverage, no roaming contract etc.)

At least another objective of the present subject matter is to provide SMS payload delivery via Application function and a Mobile Application in UE. Mobile-App is encrypted at the application level and secured. Additionally, the SMS when delivered on the UE is readable or at least many Applications access such SMS reading for enhanced user experience, thereby posing security concerns/hacking. The present subject matter addresses the same.

At least another objective of the present subject matter is to position a mobile network operator ahead of OTT players solution, which are typically based on OTT application layer only. This is especially important since SMS has already seen great competition from OTT player's applications such as WhatsApp, Line, etc.

FIG. 1 illustrates a state of the art artifacts and known call flows from an SMSC perspective in 3GPP networks.

Specifically, FIG. 1A hereafter provides a simplistic overview of interconnections for SMS MT from sender to receiver.

Figure 1B:
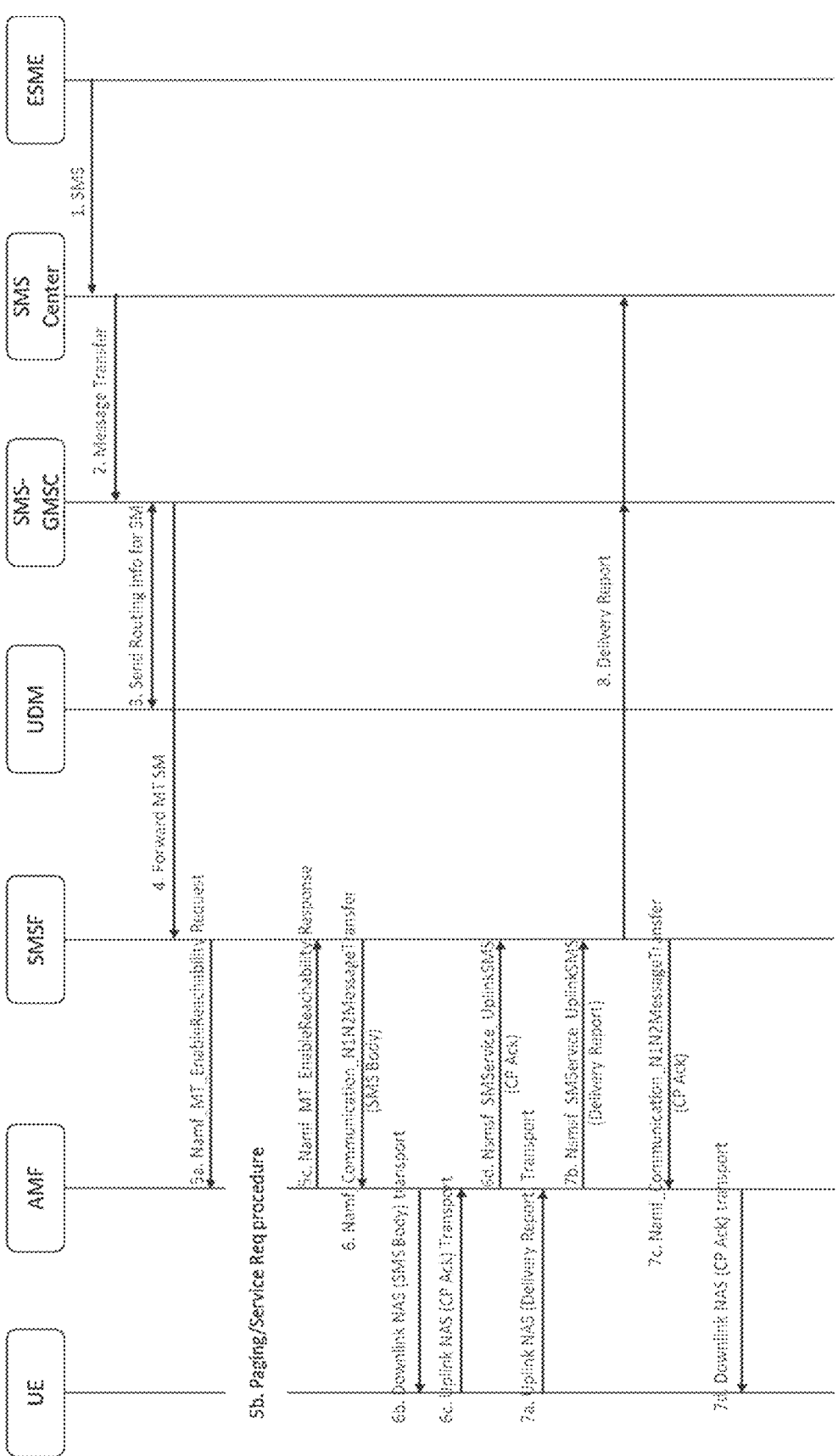

FIG. 1B further provides a sequence diagram for MT SMS over NAS in CM-IDLE state via 3GPP access. The sequence of FIG. 1B may be explained as follows:

Step 1. SMS to be sent to the subscriber is submitted by ESME to SMS Center (SC).

Steps 2-4. MT SMS interaction between SC/SMS-GMSC/UDM follows the current procedure as defined in TS 23.040. If two AMFs are serving the UE, one is for 3GPP access and another is for non-3GPP access, there are two SMSF addresses stored in UDM/UDR. The UDM shall return both SMSF addresses.

Step 5. The SMSF checks the SMS management subscription data. If SMS delivery is allowed, SMSF invokes Namf_MT_EnableUEReachability service operation to AMF. AMF pages the UE. The UE responds to the page with Service Request procedure. If the AMF indicates SMSF that UE is not reachable, the procedure of the unsuccessful Mobile terminating SMS delivery is performed and process terminates. If the UE accesses the AMF via both 3GPP access and non-3GPP access, the AMF determines the Access Type to transfer the MT-SMS based on operator local policy.

Steps 6a-6b. SMSF forwards the SMS message to be sent as defined in TS 23.040 (i.e. the SMS message consists of CP-DATA/RP-DATA/TPDU/SMS-DELIVER parts) to AMF by invoking Namf_Communication_N1N2MessageTransfer service operation. The AMF transfers the SMS message to the UE.

Steps 6c-6d. The UE acknowledges receipt of the SMS message to the SMSF. For uplink unitdata message toward the SMSF, the AMF invokes Nsmsf_SMService_UplinkSMS service operation to forward the message to SMSF. In order to permit the SMSF to create an accurate charging record, the AMF also includes IMEISV, the current UE Location Information (ULI) of the UE as defined in TS 23.501 clause 5.6.2 and, if the SMS is delivered to the UE via 3GPP access, the local time zone.

Steps 7a-7b. The UE returns a delivery report as defined in TS 23.040. The delivery report is encapsulated in an NAS message and sent to the AMF which is forwarded to SMSF by invoking Nsmsf_SMService_UplinkSMS service operation.

Steps 7c-7d. The SMSF acknowledges receipt of the delivery report to the UE. The SMSF uses Namf_Communication_N1N2MessageTransfer service operation to send SMS CP ack message to the AMF. The AMF encapsulates the SMS message via a NAS message to the UE. If SMSF has more than one SMS to send, the SMSF and the AMF forwards subsequent SMS/SMS ack/delivery report the same way as described in steps 5-7c.

In case the SMSF knows the SMS CP ack is the last message to be transferred for UE, the SMSF shall include a last message indication in the Namf_Communication_NIN2Message Transfer service operation so that the AMF knows no more SMS data is to be forwarded to UE. As may be understood, the behavior of AMF may be based on the "last message indication" and may be implementation-specific.

Step 8: This step is performed in parallel to steps 7c and 7d, such that the SMSF delivers the delivery report to SC as defined in TS 23.040.

The descriptions of forthcoming figures illustrate a call flow in accordance with the present subject matter and refers SMS Delivery to UE via NEF/Operator application function (AF). The present subject matter proposed a delivery mechanism where UE can subscribe for SMS delivery via operator's application client (Ex myAT&T, "My Verizon" etc.). Multiple user configurations can be supported as follows:

1. Default (0): Deliver SMS to MSISDN by traditional mechanisms (State of the art of FIG. 1)

2. Option (1) Deliver to app when traditional SMS delivery mechanisms to MSISDN fail 3. Option (2) Deliver to both MSISDN and App 4. Option (3) Deliver to App only The forthcoming description of FIGS. 2 to 5 describes the detailed solution for Option 1 (i.e. Deliver to App when traditional SMS delivery mechanisms to MSISDN fail) where SMS delivery destined for MSISDN fails due to various possible reasons including network coverage/congestion/DDoS attack etc. The present subject matter renders it possible to send an SMS to operator's application client. The same also holds applicable for arriving at the solution for option 2 and option 3. These options are specifically useful for roaming scenarios where user may not have opted for roaming service but still has data connectivity (Hotel/Office Wi-Fi etc.) which can then enable the user to receive SMS via operator application client.

The present subject matter's overall solution may be classified divided into two phases as follows:

1. Configuration Update Phase: This phase covers the different methods on how UE will share the preferences configured on UE among the four options (Options 0 to 3) as mentioned above.

Figure 2:
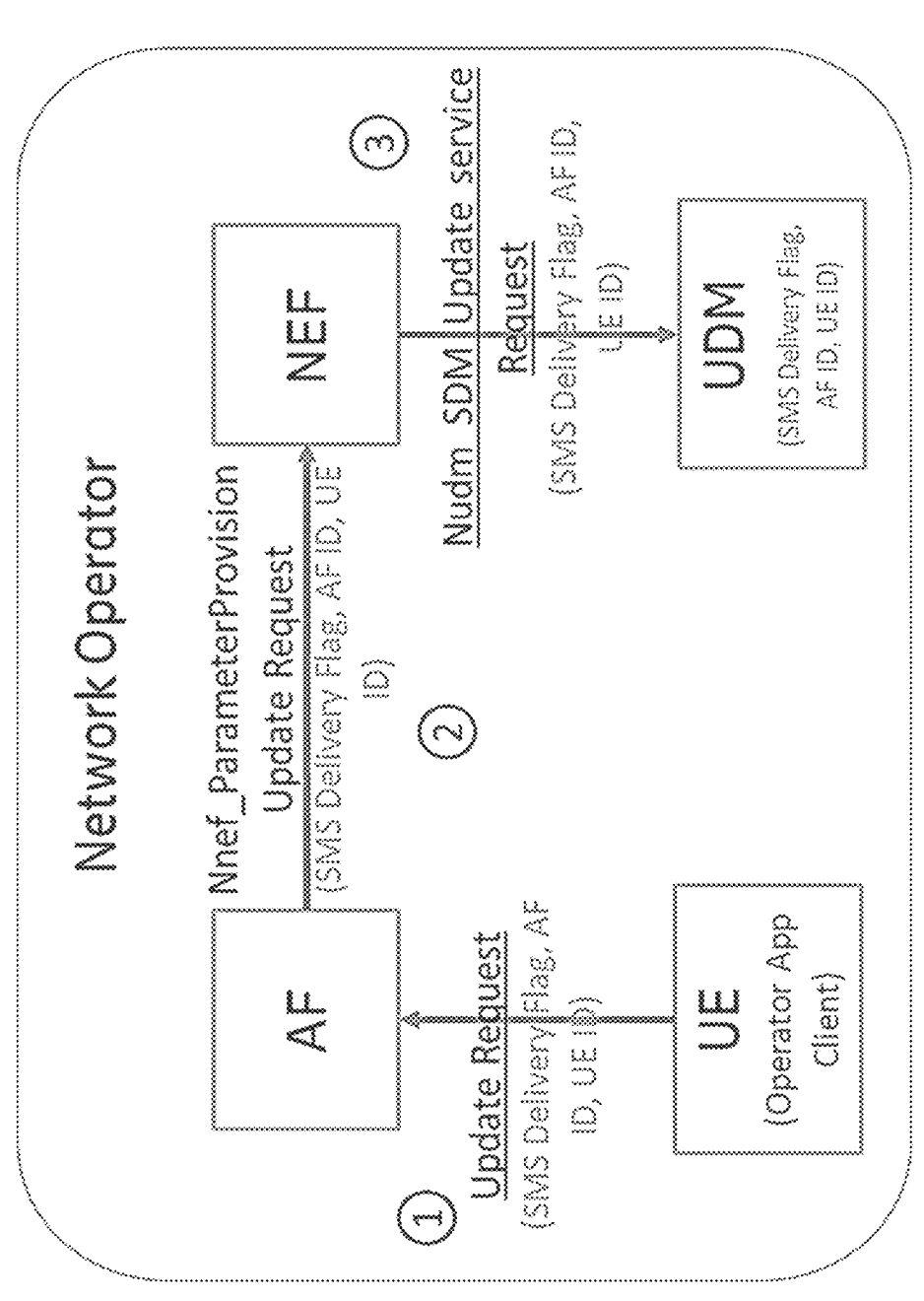
FIG. 2 illustrates a configuration update phase and refers a subscription data update via Operator Application Function, in accordance with an embodiment of the present subject matter.

2. SMS Delivery Phase: This phase covers the call flow for phase 1 i.e. when SMS is not delivered via the traditional method, then delivering the SMS payload via Operator's APP As a part of the Configuration Update phase two possible mechanisms have been detailed in the description of forthcoming FIGS. 2 and 3 to update the user-configuration at the application client for SMS delivery preference towards UDM FIG. 2 illustrates a configuration update phase and refers to a subscription data update via Operator Application Function in accordance with an embodiment of the present subject matter. As a part of FIG. 2, a user configures the SMS delivery flag at the operator's application client installed on his/her UE which is then further communicated to NEF/UDM via Application Function (AF). A further parameter "SMS Delivery Flag (0|1|2|3)" would be added to indicate the preference for SMS delivery configured by the user at the operator's app client and will be stored in UDM to be used later during the SMS delivery.

In operation, the process of FIG. 2 may be illustrated in accordance with the following steps:

Step 1: Operator application client at UE sends the update message to Operator Application Function (AF) including the UE preference for SMS delivery (SMS delivery flag)

Step 2: AF invokes the "Nnef_ParameterProvision" update request towards NEF for provisioning the data at UDM.

Step 3: NEF sends the "Nudm_SDM Update" service request to update the subscription data including the UE preference for how to deliver the SMS (SMS delivery flag) and associated AF ID Step 4: UDM stores the subscription data for UE.

Figure 3:
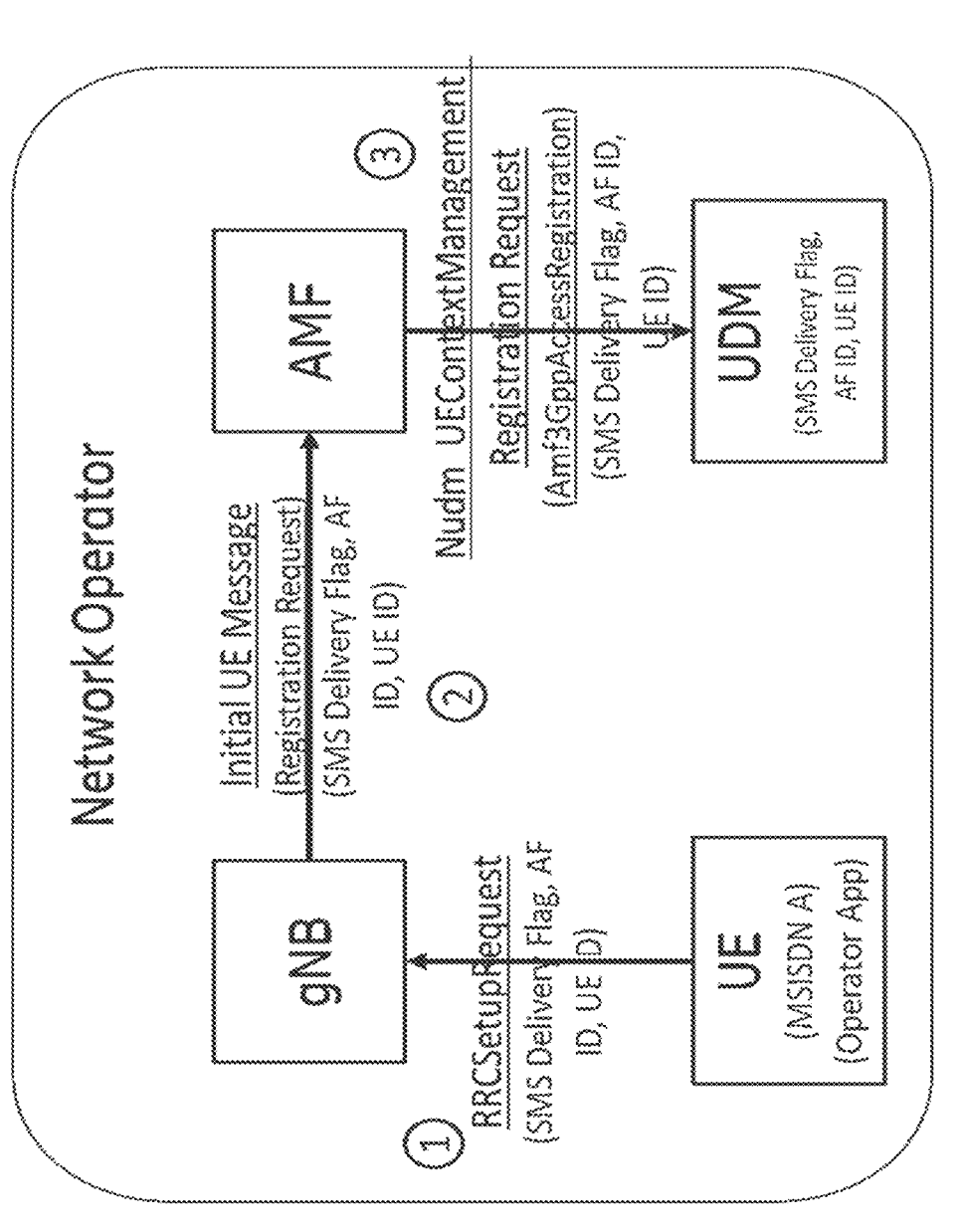
FIG. 3 illustrates another configuration update phase and refers to subscription data update via conventional UE registration procedure, in accordance with an embodiment of the present subject matter.

FIG. 3 illustrates another configuration update phase and refers to subscription data update via conventional UE registration procedure in accordance with an embodiment of the present subject matter. As a part of FIG. 3, the user configures the SMS delivery flag at the operator's application client installed on his/her UE. The UE initiates the registration procedure using one of the following registration types:

Initial Registration to the 5GS;

Mobility Registration Update upon changing to a new Tracking Area (TA) outside the UE's Registration Area in both CM-CONNECTED and CM-IDLE state, or when the UE needs to update its capabilities or protocol parameters that are negotiated in Registration procedure with or without changing to a new TA, a change in the UE's Preferred Network behavior that would create incompatibility with the Supported Network behavior provided by the serving AMF, or when the UE intends to retrieve LADN Information; or Periodic Registration Update (due to a predefined time period of inactivity); or Emergency Registration The following are the cleartext IEs, as defined in TS 24.501 that can be sent by the UE in the Registration Request message:

Registration type

SUCI or 5G-GUTI or PEI

Security parameters additional GUTI

4G Tracking Area Update the indication that the UE is moving from EPS

In accordance with the present subject matter, further IEs are added to indicate the preference for SMS delivery configured by user at operator's app client and to be stored in UDM to be used later during the SMS delivery i.e.

SMS Delivery Flag (0|1|2|3)

AF ID

In operation, the subscription data update at UDM via UE Registration in FIG. 3 may be defined as the following sequence of steps:

Step 1: UE sends the Registration Request message to (R)AN (gNB in our example, otherwise eNodeB may be also construed) containing cleartext IEs and non-cleartext IEs.

Step 2: The gNB forwards the Registration Request message to the AMF based on the N2 connection of the UE.

Step 3: AMF sends the registration data, including the UE preference for how to deliver the SMS (SMS delivery flag) and associated AF ID Step 4: UDM stores the information provided at AMF registration.

Figure 4:
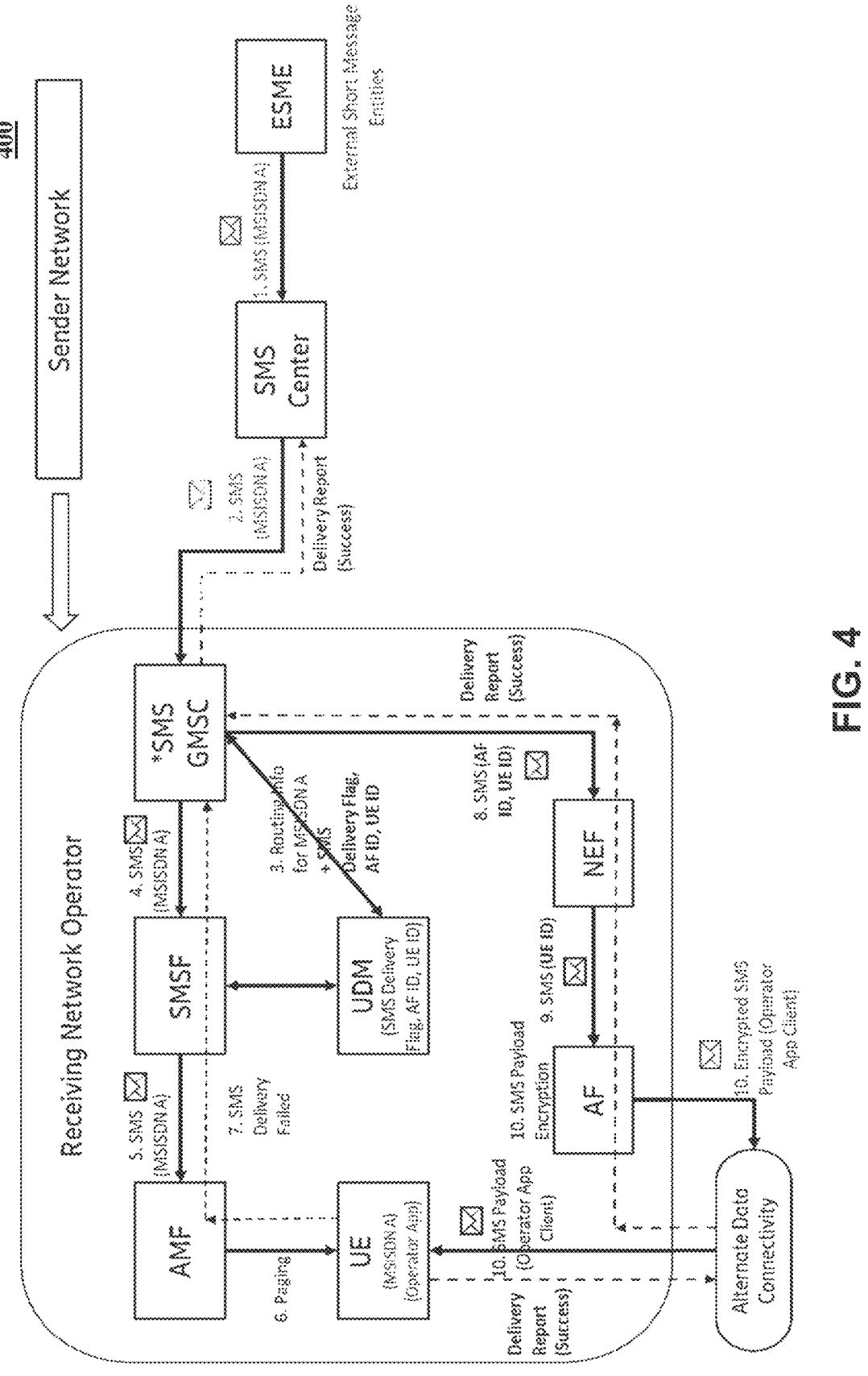
FIG. 4 illustrates an SMS Delivery Phase and refers SMS Delivery to Mobile network operator's application client installed at the UE, in accordance with an embodiment of the present subject matter.

FIG. 4 illustrates an SMS Delivery Phase and refers to SMS Delivery to Mobile network operator's application client installed at the UE. In accordance with FIG. 4, the SMS-GMSC will receive the "SMS delivery flag (=1)" from UDM in response to the "Send Routing Info for SM" message. If the conventional SMS delivery over mobile network operator's network fails for MSISDN, then SMS-GMSC triggers NEF to re-attempt the SMS delivery to UE. NEF sends the SMS to operator's application function (AF) which encrypts the SMS payload and delivers the SMS to operator's application client installed on UE over the alternative data connectivity (Ex. Wi-Fi Broadband).

As provided in FIG. 4, a high-level visualization of SMS delivery failure to MSISDN A and the re-attempted SMS delivery to the operator's application client installed on UE has been depicted.

Figure 5:
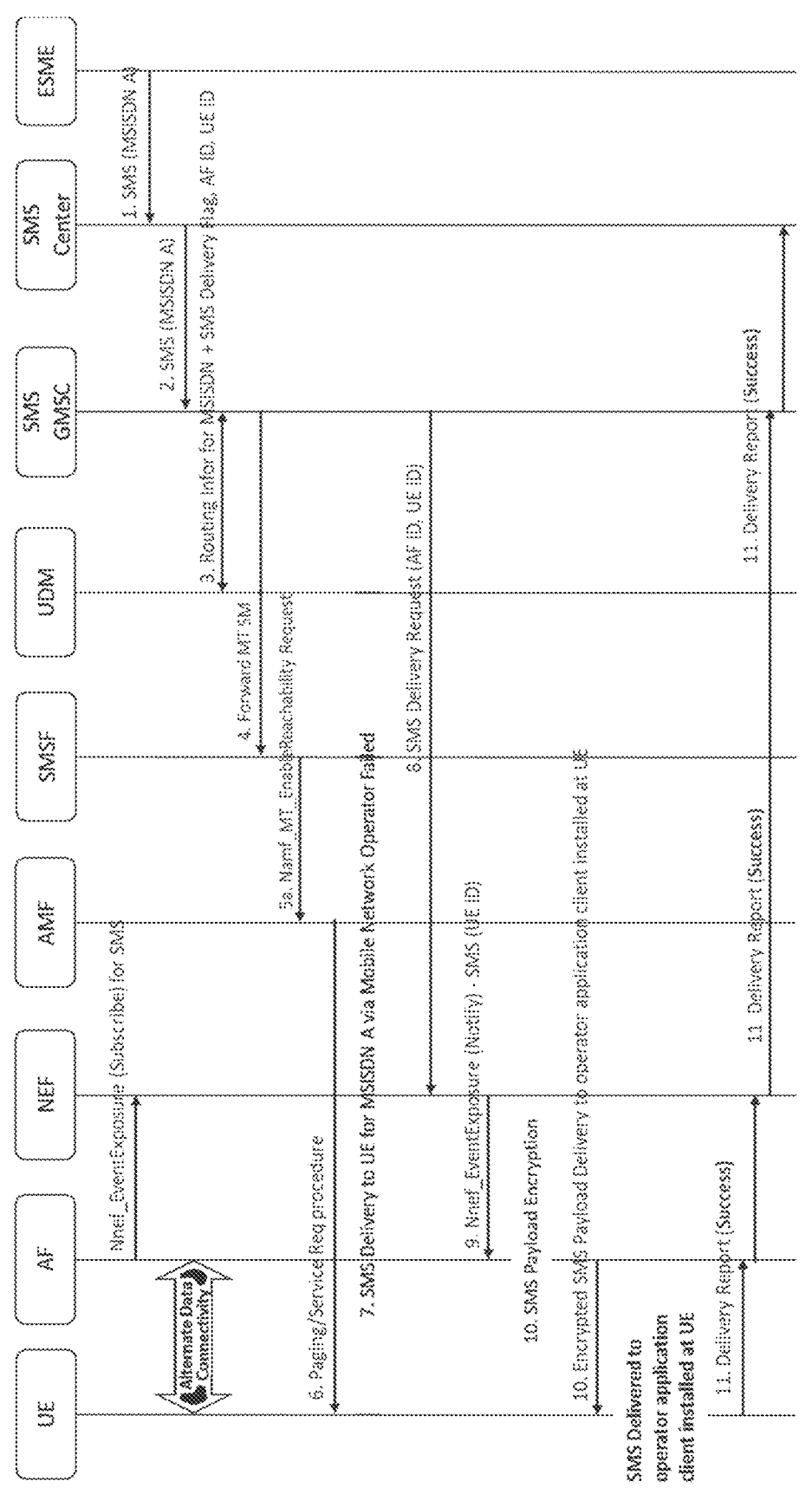
FIG. 5 illustrate an alternate representation of sequence diagram of FIG. 4 and accordingly refers the SMS Delivery

FIG. 5 illustrate an alternate representation of the sequence diagram of FIG. 4 and accordingly refers to the SMS Delivery Phase to the operator's application client installed at UE.

The sequential operation of FIG. 4 and FIG. 5 may be jointly illustrated under following steps:

Step 1. ESME (like bank, retail stores, advertisers etc.) submits a SMS to SMS Center (SMSC) to be delivered to UE (MSISDN A).

Step 2. SMSC translates the MSISDN A and identifies SMS-GMSC of the receiving network operator (host network operator for MSISDN A).

Step 3. SMS-GMSC obtains the routing information for MSISDN A (i.e. SMSF address) which includes the flag indicating the SMS delivery preference (SMS Delivery Flag) and associated AF ID.

Step 4. SMS-GMSC forwards the SMS message (Forward MT SM) to SMSF.

Step 5. The SMSF checks the SMS management subscription data. If SMS delivery is allowed, SMSF invokes Namf_MT_EnableUEReachability service operation to AMF.

Step 6. AMF pages the UE but UE is not reachable for example due to no coverage indoors.

Step 7. AMF informs the SMSF that it cannot deliver the MT-SMS to the UE. SMSF sends a failure report to the SMS-GMSC.

Step 8. Upon receiving MT-SMS failure report, the SMS-GMSC, based on SMS delivery flag (=1 i.e. deliver to operator client application at UE when traditional SMS delivery fails), re-attempts the MT-SMS delivery via the other entity i.e. NEF. SMS-GMSC submits the SMS to NEF while providing the AF ID and UE ID.

Step 9. NEF notifies (Nnef_EventExposure (Notify)) Application Function (as it has subscribed with NEF for SMS events) for the action to deliver SMS to operator application client identified by UE ID.

Step 10. AF encrypts the SMS payload and deliver it over I/P (via alternate data connectivity like Wi-Fi hotspot, Wi-Fi broadband etc.) to the operator application client installed at UE.

Step 11. Successful SMS delivery report is sent from UE=>AF=>NEF=>SMS-GMSC=>SMSC.

At least by virtue of the preceding description, the present subject matter at least offers the following advantages:

A) Enhanced user experience and better connectivity for MT SMS when connectivity by mobile network operator is not available (indoor location, patchy coverage, no roaming contract etc.)

B) SMS payload delivery via Application function App is encrypted at application level and is more secure.

C) SMS is facilitated to be received both through cellular connection and data connection, thereby positioning a mobile network operator ahead of OTT players solution, which are typically based on OTT application layer only.

D) Last but not least, with respect to Multi USIM UE where UE is configured with multiple SIMs (from different operators), the user may advantageously enable the operator's/network to deliver the SMS/OTP pin via another non-primary MSISDN/SIM, if the same is not possible with attached MSISDN/operator. In an example, 5G core NFs such as UDM may save a list of alternative MSISDN's to deliver the SMS in case the MT SMS delivery fails on a primary MSISDN.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method of operation of a User Equipment (UE) in a wireless communication system, said method comprising:
  sending by an operator application within the UE an update message to an Operator Application Function (AF);
  incorporating within the update message by the UE a UE identifier (UE ID), an AF identifier (AF ID), and a preference for Short Message System (SMS) delivery comprising one of:
    deliver SMS to Mobile Station Integrated Services Digital Network (MSISDN) by traditional mechanisms,
    deliver to the operator application when traditional SMS delivery mechanisms to MSISDN fail,
    deliver to both MSISDN and the operator application, and
    deliver to the operator application only; and
  registering an SMS delivery subscription by the UE at a unified data management (UDM) node based on the update message.

2. The method of operation as claimed in claim 1, further comprising:
  experiencing low cellular network coverage pertaining to Mobile Station International Subscriber Directory Number (MSISDN) of the UE leading to non-receipt of a Mobile Terminated SMS (MT-SMS) at the UE;
  receiving an MT-SMS within the operator application of the UE from the AF through a data connection, said MT-SMS having been formerly directed to the MSISDN of the UE; and
  sending successful SMS delivery report from the UE to an SMS Gateway/interworking Mobile Switching Center (SMS-GMSC) by the AF based on receipt of the MT-SMS.

3. A method of operation of a User Equipment (UE) in a wireless communication system, said method comprising:
  sending by a UE a Registration Request message to an access network node;
  incorporating within the request message by the UE a preference for Short Message System (SMS) delivery, a UE identifier (UE ID) and an AF identifier (AF ID); and registering an SMS delivery subscription by the UE at a unified data management (UDM) node based on the request message.

4. The method of operation as claimed in claim 3, further comprising:
  experiencing low cellular network coverage pertaining to MSISDN of the UE leading to non-receipt of an MT-SMS at the UE;
  receiving a Mobile Terminated SMS (MT-SMS) within the operator application of the UE from the AF through a data connection, said MT-SMS having been formerly directed to the MSISDN of the UE; and
  sending successful SMS delivery report from the UE to an SMS Gateway/interworking Mobile Switching Center (SMS-GMSC) by the AF based on receipt of the MT-SMS.

5. A User Equipment (UE) in a wireless communication system, said UE comprising an operator application operable by a processor and configured for:
  sending an update message to an Operator Application Function (AF);
  incorporating within the update message a UE identifier (UE ID), an AF identifier (AF ID), and a preference for Short Message System (SMS) delivery comprising one of:
    deliver SMS to Mobile Station Integrated Services Digital Network (MSISDN) by traditional mechanisms,
    deliver to the operator application when traditional SMS delivery mechanisms to MSISDN fail,
    deliver to both MSISDN and the operator application, and
    deliver to the operator application only; and
  registering an SMS delivery subscription at a unified data management (UDM) node based on the update message.

6. The UE as claimed in claim 5, wherein the transceiver in the UE is further configured for:
  experiencing low cellular network coverage pertaining to Mobile Station International Subscriber Directory Number (MSISDN) leading to non-receipt of a Mobile Terminated SMS (MT-SMS);
  receiving an MT-SMS within the operator application from the AF through a data connection, said MT-SMS having been formerly directed to the MSISDN; and
  sending successful SMS delivery report to an SMS Gateway/interworking Mobile Switching Center (SMS-GMSC) by the AF based on receipt of the MT-SMS.

7. A User Equipment (UE) in a wireless communication system, said UE comprising a processor forming a part of a transceiver and configured for:
  sending, by an operator application within the UE, a Registration Request message to an access network node;
  incorporating within the request message a UE identifier (UE ID), an AF identifier (AF ID), and a preference for Short Message System (SMS) delivery comprising one of:
    deliver SMS to Mobile Station Integrated Services Digital Network (MSISDN) by traditional mechanisms,
    deliver to the operator application when traditional SMS delivery mechanisms to MSISDN fail, deliver to both MSISDN and the operator application, and deliver to the operator application only; and registering an SMS delivery subscription by the UE at a unified data management (UDM) node based on the request message. 5

8. The UE as claimed in claim 7, wherein the transceiver in the UE is further configured for:

experiencing low cellular network coverage pertaining to Mobile Station International Subscriber Directory 10 Number (MSISDN) leading to non-receipt of a Mobile Terminated SMS (MT-SMS);

receiving an MT-SMS within the operator application from the AF through a data connection, said MT-SMS having been formerly directed to the MSISDN; and 15 sending successful SMS delivery report to an SMS Gateway/interworking Mobile Switching Center (SMS-GMSC) by the AF based on receipt of the MT-SMS.

* * * * *